United States Patent
Odachi et al.

[19]

[11] Patent Number: 5,855,261
[45] Date of Patent: Jan. 5, 1999

[54] NON-CONTACT ELECTRIC POWER SUPPLYING SYSTEM FOR VEHICLE

[75] Inventors: Yasuharu Odachi; Masaki Takasan; Norimoto Minoshima, all of Aichi, Japan

[73] Assignee: Kabushiki Kaisha Toyoda Jidoshokki Seisakusho, Kariya, Japan

[21] Appl. No.: 888,037

[22] Filed: Jul. 3, 1997

[51] Int. Cl.$^6$ ...................................................... H02J 17/00
[52] U.S. Cl. ............................ 191/10; 318/16; 336/84 M
[58] Field of Search ............................... 191/10; 104/290, 104/292, 293, 294; 310/12; 318/16; 320/109; 336/84 R, 84 C, 84 M

[56] References Cited

U.S. PATENT DOCUMENTS 5,619,078   4/1997   Boys et al. ................................. 191/10

FOREIGN PATENT DOCUMENTS 630503   2/1994   Japan .

Primary Examiner—Mark Tuan Le
Attorney, Agent, or Firm—Brooks Haidt Haffner & Delahunty

[57] ABSTRACT

A system for supplying electric power to an electrically powered vehicle includes a feeder disposed along a structural member as a guide rail that guides the vehicle. The vehicle has an electric power receiving unit that receives electric power from the feeder on a non-contact basis. The electric power receiving unit has a ferrite core with a coil. A ferrite sheet is disposed on a surface of the structural member in such a manner that the ferrite sheet is opposite to the electric power receiving unit. The feeder is surrounded by the ferrite core and the ferrite sheet. When an AC current is supplied to the feeder, a magnetic flux that penetrates the ferrite core and the ferrite sheet varies, thereby causing electromotive force to occur in the coil.

9 Claims, 6 Drawing Sheets

NON-CONTACT ELECTRIC POWER SUPPLYING SYSTEM FOR VEHICLE

BACKGROUND OF THE INVENTION

1. Field of the Invention

The present invention relates to a non-contact type electric power supplying system for supplying electric power to a vehicle on a non-contact basis.

2. Description of the Related Art

Electrically powered vehicles, such as transportation means such as electric train carriages and monorails, and self-guided vehicles that carry parts in factories, and so forth are known. As one of means for supplying electric power to such electrically powered vehicles, a charging station system has been implemented. In the charging station system, however, whenever the electric power of the battery of the vehicle begins to run out, the user thereof should drive the vehicle to a charging station and charge it with electric power. Thus, when a parts conveying system in a factory is operated using such a charging system, the operating efficiency is low. Thus, when an electrically powered vehicle travels only over a predetermined route, a more effective system is required. To solve this problem, an electric power supplying system is used.

In the electric power supplying system, as in electric trains and monorails, a contact-type of electric power supplying system has been widely implemented. However, in this system, since the contact portions get worn, they should be maintained and periodically replaced with new ones. Moreover, in the contact-type electric power supplying system, since the contact portions are subject to sparking, such a system cannot be used in an explosion-protected area.

To solve such problems, non-contact type electric power supplying systems have been developed and implemented. Next, a non-contact type electric power supplying system will be described with reference to FIGS. 1 and 2.

FIG. 1 shows a conveying system using a system for supplying electric power from a feeder on a non-contact basis. In FIG. 1, a guide rail 12 is disposed on a route of a vehicle 13 as an example of the vehicle (denoted by dashed lines). A feeder 5 is disposed along the guide rail 12. The feeder 5 is composed by coating a conductor wire such as a copper wire with an insulation material. The feeder 5 is routed from a start point X of the guide rail 12 to an end point Y thereof. AC current is supplied from an AC power supply 11 to the feeder 5. The vehicle 13 has an electric power receiving unit 2 that receives electric power from the feeders on a non-contact basis. With the electric power received by the electric power receiving unit 2, the vehicle 13 travels from the start point X to the end point Y of the guide rail 12.

FIG. 2 is a partial sectional view showing the conveying system shown in FIG. 1. FIG. 2 shows principal portions including the electric power receiving unit 2 and the feeder 5 for explaining an electric power supplying method.

The guide rail 12 has a guide portion 15 that guides the vehicle 13. In addition, the electric power receiving unit 2 has guide rollers 14 that clamp the guide portion 15 of the guide rail 12. When the vehicle 13 travels, the guide rollers 14 rotate. In other words, the vehicle 13 travels along the guide rail 12.

The guide rail 12 has an outbound portion and a inbound portion of the feeder 5. The feeder 5 is held by support members 6 secured to the guide rail 12. As shown in FIG. 1, the feeder 5 supplies current from the AC power supply 11 so that the current is returned at the end point Y. In FIG. 2, the directions of the currents that flow in the outbound portion and the inbound portion of the feeder 5 are always reverse.

The electric power receiving unit 2 has an E-shaped magnetic material core 3. The E-shaped magnetic material core 3 is made of, for example, silicon steel or ferrite and formed in the shape of the letter E. The E-shaped magnetic material core 3 has a secondary coil 4 on the center protrusion portion thereof.

When the vehicle 13 is placed on the guide rail 12, the outbound portion and the inbound portion of the feeder 5 are placed in respective groove portions of the E-shaped magnetic material core 3. In this state, when an AC current is supplied to the feeder 5, the AC current causes an Alternating magnetic field to be generated. The Alternating magnetic field penetrates the E-shaped magnetic material core 3. Thus, due to the electromagnetic induction, the alternating magnetic field causes the secondary coil 4 to generate electromotive force. The electric power generated in the secondary coil is supplied to the vehicle 13. When the vehicle 13 travels, the guide rollers 14 or tires (not shown) provided for the vehicle 13 are rotated by the electric power. As described above, the electric power is supplied from the feeder 5 to the vehicle 13 on a non-contact basis.

In the non-contact type electric power supplying system using such electromagnetic induction effect, the supplying efficiency is an important factor. Next, with reference to FIG. 3, a problem about the supplying efficiency will be described.

In FIG. 3, a structural member 1 accords with the guide rail 12 shown in FIG. 2. The structural member 1 is made of aluminum, iron, or the like.

When the directions of the AC currents that flow in the outbound portion and the inbound portion (hereinafter, referred to as feeder 5-1 and feeder 5-2, respectively) are as shown in FIG. 3, the orientations of the magnetic fluxes thereof are denoted by arrows shown in FIG. 3. In other words, magnetic fluxes that flow around the feeders 5-1 and 5-2 are generated in the reverse directions. At this point, the magnetic flux generated by the feeder 5-1 penetrates the inside of the E-shaped magnetic material core 3 and travels from an edge portion A of the center protrusion portion of the E-shaped magnetic material core 3 to an edge portion B of an end protrusion portion thereof.

Part of the magnetic flux emitted from the edge portion A reaches the structural member 1. Thus, an eddy current that cancels the magnetic flux is generated in the structural member 1. Since part of the electric power supplied from the feeder 5 is consumed as heat by the eddy current, the electric power that is available on the secondary side (the electric power receiving unit 2) is decreased.

To solve such a problem, a technology disclosed in, for example, Japanese Patent Laid-Open Publication No. 6-30503, is known. (Hereinafter, the disclosed technology is referred to as the related art reference.) In the related art reference, a paramagnetic amorphous member (30) is disposed in a bracket (32) secured to a guide rail (the guide rail corresponds to the structural member 1 shown in FIG. 3) so as to decrease the eddy current that flows in the guide rail. However, since an eddy current is generated in the paramagnetic amorphous member because the electric resistance thereof is low, electric power is still consumed by the eddy current.

SUMMARY OF THE INVENTION

The purpose of the present invention is to provide a non-contact type electric power supplying system with a low power loss and good supplying efficiency. A non-contact type electric power supplying system of the present invention, is based on a structure that has a feeder disposed along a structural member that guides an electrically powered vehicle and supplies electric power from the feeder to an electric power receiving unit of the electrically powered vehicle. A high resistance magnetic material member is disposed on a surface of the structural member in such a manner that the high resistance magnetic material member is opposite to the electric power receiving unit.

The high resistance magnetic material member is a material whose relative magnetic permeability is 50 or more and whose specific resistance is 300 $\mu\Omega$ cm or more. Examples of the high resistance material member are ferrite and permalloy.

When the high resistance magnetic material member is disposed at the above-mentioned position, a magnetic flux induced by a current supplied to the feeder flows in a closed magnetic circuit formed by the core of the electric power receiving unit and the high resistance magnetic material member.

When a radio frequency AC current is supplied to the feeder, the magnetic flux induced by the current does not penetrate to the inside of the high resistance magnetic material member due to the skin effect. Thus, even if the high resistance magnetic material member is thinly formed in, for example, a sheet form, the high resistance magnetic material member can shield the magnetic flux, thus preventing the magnetic flux from permeating to the inside of the structural member. Thus, no eddy current is generated in the structural member. In addition, since the electric resistance of the high resistance magnetic material member is high, even if the magnetic flux varies therein, it prevents an eddy current from flowing. Thus, according to the present invention, the loss of the electric power due to the eddy current is small. In other words, the electric power received by the electric power receiving unit becomes greater. Consequently, the power supplying efficiency is improved.

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 1:
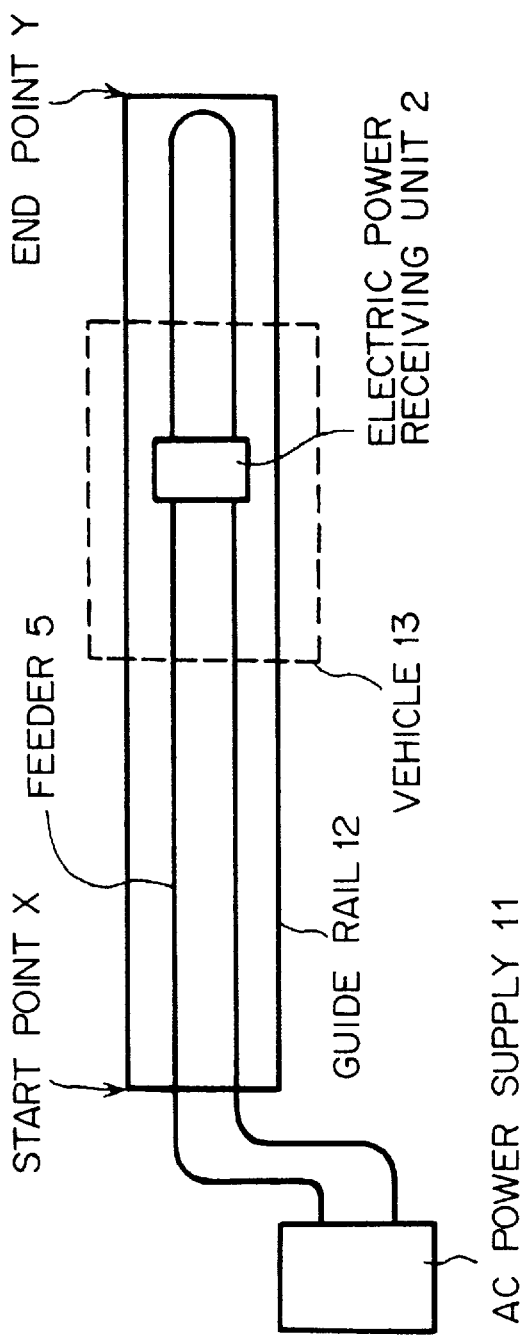
FIG. 1 is a schematic diagram showing a system for supplying electric power from a feeder to a vehicle on non-contact basis.
Figure 2:
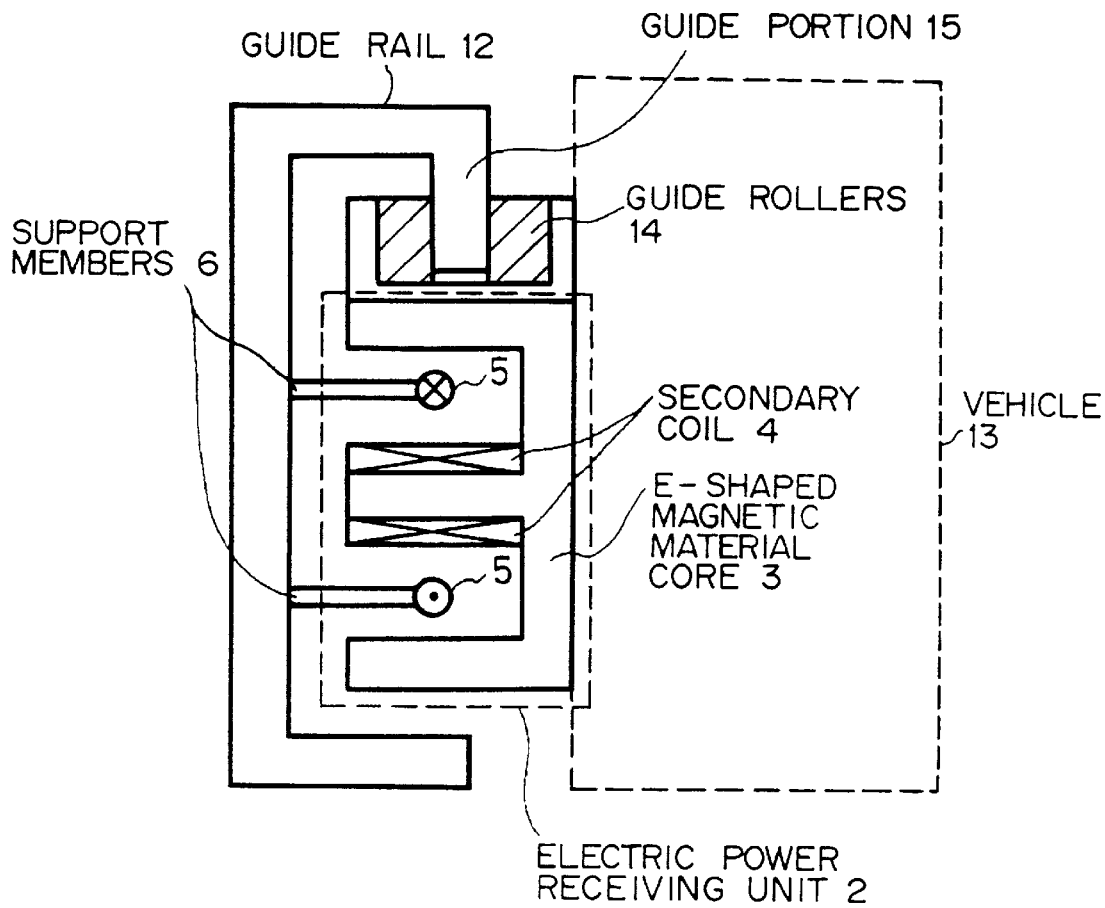
FIG. 2 is a partial sectional view showing the system shown in FIG. 1 and principal portions including an electric power receiving unit and a feeder for explaining an electric power supplying method thereof.

Next, with reference to the accompanying drawings, a non-contact type electric power supplying system according to the present invention will be described. For simplicity, in FIG. 4, similar portions to those in FIG. 3 are denoted by similar reference numerals.

Figure 3:
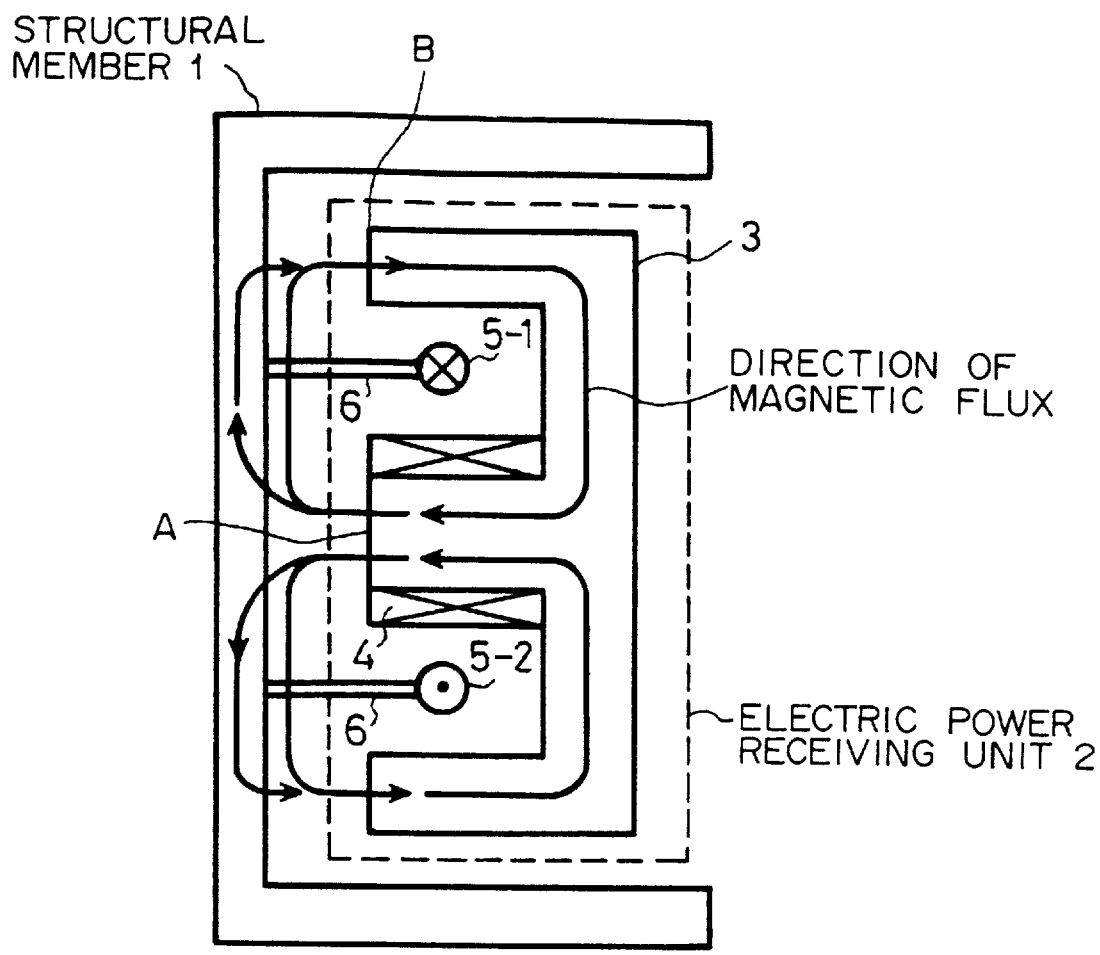
FIG. 3 is a schematic diagram for explaining a problem about a conventional non-contact type electric power supplying system.

The structure of the non-contact type electric power supplying system according to the embodiment is different from the structure shown in FIG. 3 in that a ferrite sheet 7 is disposed on a structural member 1 in such a manner that the ferrite sheet 7 is opposite to the E-shaped magnetic material core 3. In this structure, the feeder 5 is surrounded by the ferrite sheet 7 and the E-shaped magnetic material core 3, and both are made of materials whose magnetic permeability is high.

Figure 4:
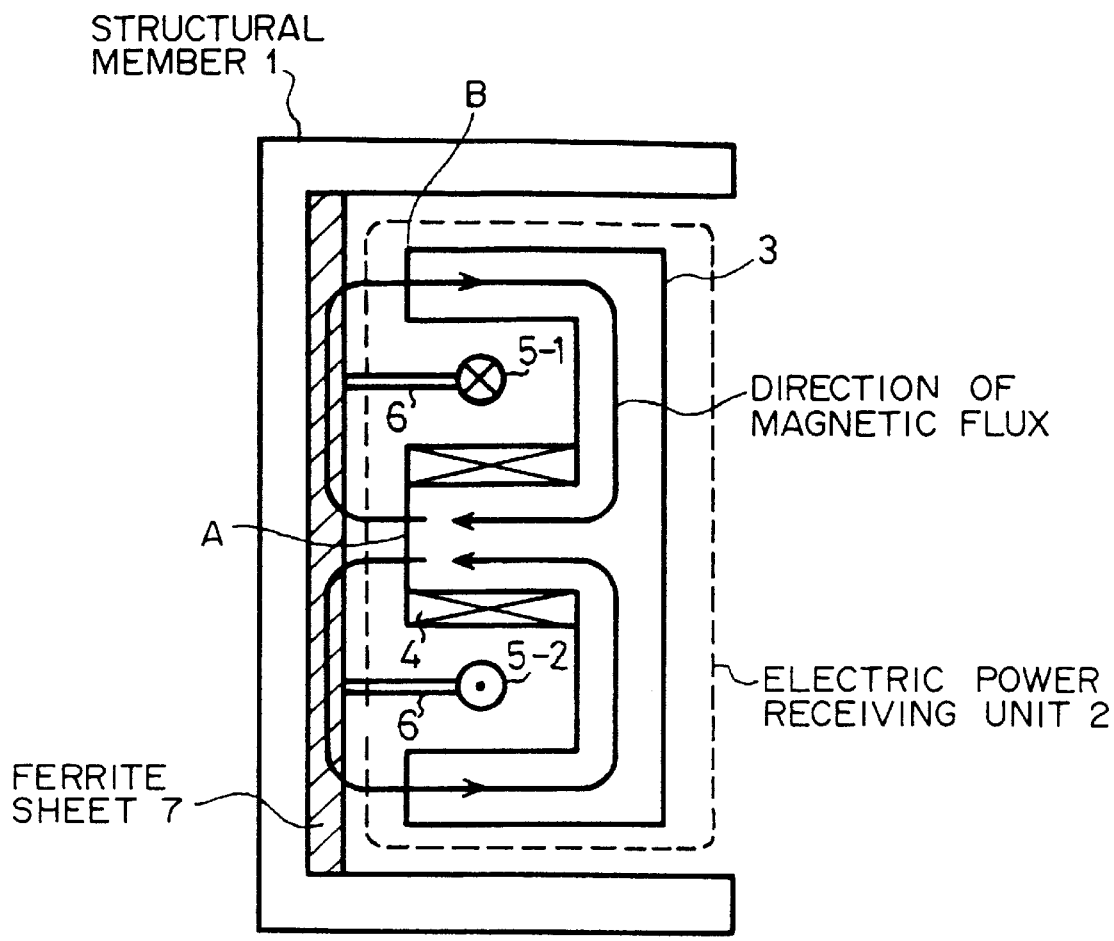
FIG. 4 is a schematic diagram showing principal portions of a non-contact type electric power supplying system according to an embodiment of the present invention.

In this structure, when the orientation of an AC current that flows in the feeder 5 is as shown in FIG. 4, the magnetic flux induced by the current travels as denoted by arrows shown in the drawing. In other words, for example, the magnetic flux induced by the current that flows in the feeder 5-1 penetrates the inside of the E-shaped magnetic material core 3 clockwise around the feeder 5-1. Thereafter, the magnetic flux travels from an edge portion A of the E-shaped magnetic material core 3 to the ferrite sheet 7. Next, the magnetic flux penetrates the ferrite sheet 7 and travels to an edge portion B of an end portion of the E-shaped magnetic material core 3.

In the conventional structure, as was described with reference to FIG. 3, the magnetic flux penetrates the inside of the structural member 1. An AC current is supplied to the feeder 5 so as to pass electric power to the electric power of the electric power receiving unit 2. Thus, in the structural member 1, the magnetic flux is also varied. To cancel the variation of the magnetic flux, an eddy current flows in the structural member 1.

In contrast, in the structure of the present invention, as shown in FIG. 4, the ferrite sheet 7 prevents the magnetic flux from reaching the structural member 1.

In other words, when an AC current is supplied to the feeder 5, the magnetic flux induced by the current is varied corresponding to the frequency of the AC current. Here, when using a high frequency AC current, due to the skin effect, the magnetic flux hardly penetrates the inside of the ferrite sheet 3. Instead, most of the magnetic flux only penetrates a surface portion of the ferrite sheet 7. The skin effect depends on the frequency of the AC current. That is to say, the higher the frequency, a more remarkable skin effect is obtained. When the electric power supplied to the feeder 5 is around 10 V–100 A and the frequency thereof is in the range from several kHz to several 10 kHz, the depth to which the magnetic flux penetrates the inside of the ferrite sheet 7 is around 0.1 to 0.5 mm. Thus, when the thickness of the ferrite sheet 7 is in the range from 1 to 2 mm, it can prevent the magnetic flux from penetrating the inside of the structural member 1. Consequently, no eddy current is generated in the structural member 1.

As is clear from the above-mentioned structure, when the direction of the current that flows in the feeder 5 varies, the magnetic flux varies in the ferrite sheet 7. However, the specific resistance of the ferrite sheet 7 is very large, even if force (electromotive force) that cancels the variation of the magnetic flux is generated, substantially no current flows. In other words, no eddy current is generated in the ferrite sheet 7.

Thus, according to the structure of the embodiment, no eddy current is generated in either the structural member 1 or the ferrite sheet 7. Thus, the loss of electric power due to heat when electricity is supplied from the feeder 5 to the electric power receiving unit 2 is decreased.

In the above-described embodiment, the material of the structural member 1 (guide rail) is aluminum or iron, either of which is good conductor. Thus, without the ferrite sheet 7, an eddy current is generated. Consequently, regardless of whether aluminum or iron is used as the material of the structural member 1, the ferrite sheet 7 is effective to prevent the eddy current from occurring.

Figure 5:
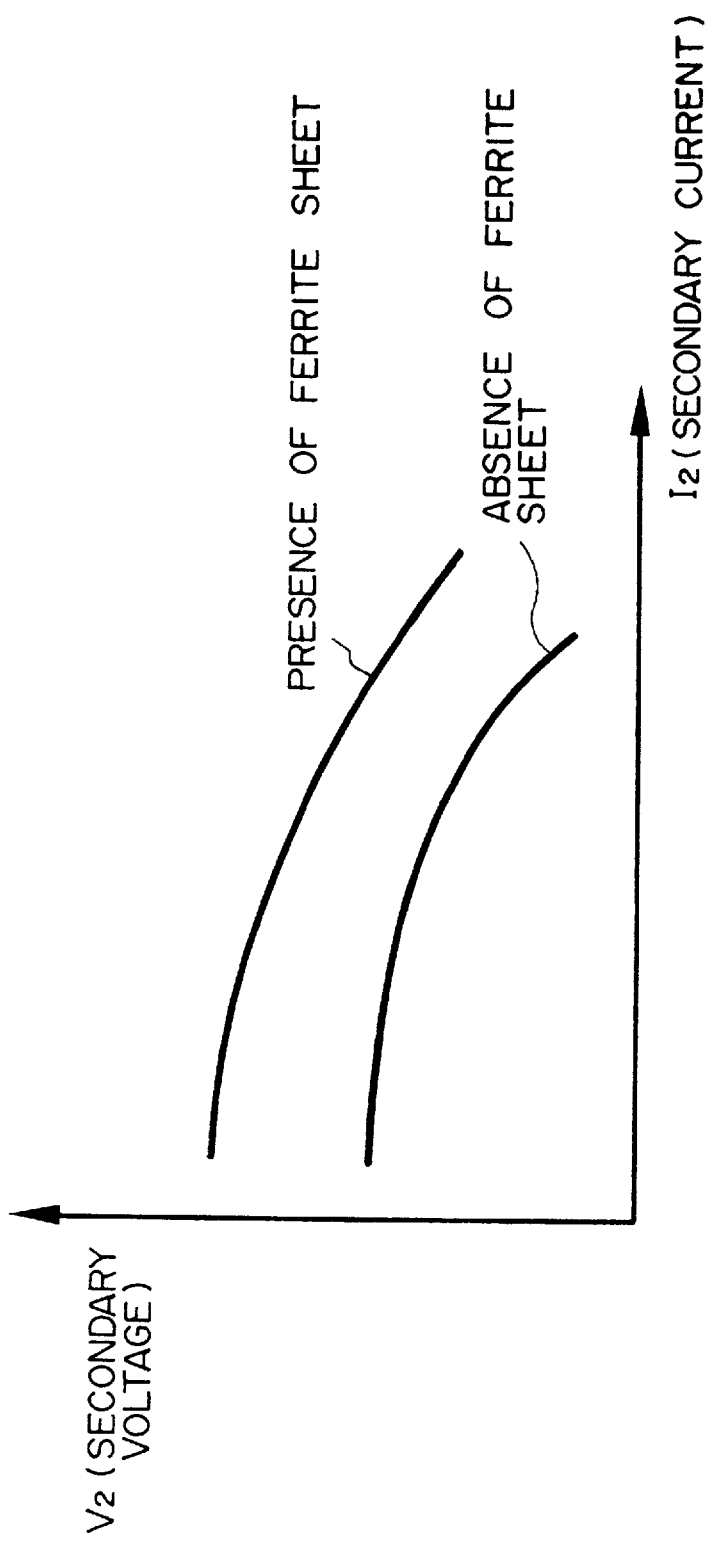
FIG. 5 is a diagram showing an effect of the structure of the embodiment.

FIG. 5 shows the effect of the ferrite sheet 7. In FIG. 5, a vertical axis $V_2$ represents a secondary voltage generated in the secondary coil 4. The horizontal axis $I_2$ represents a secondary current that flows in the secondary coil 4. The graph shows the state in the case that the voltage supplied to the feeder 5 is constant, while the load connected to the secondary coil 4 is varied. The electric power supplied from the feeder 5 (primary side) to the electric power receiving unit 2 (secondary side), namely the secondary output power, is denoted by $V_2 \cdot I_2$. It is clear from FIG. 5 that the electric power which the electric power receiving unit 2 obtains (namely, secondary output power) changes depending on whether or not the ferrite sheet 7 is disposed.

As described above, with the structure of the related art reference disclosed in Japanese Patent Laid-Open Publication No. 6-30503, the eddy current can be prevented from occurring in the structural member 1. In the related art reference, with the paramagnetic amorphous member, an effect similar to the above-described effect is obtained. However, the specific resistance of the paramagnetic amorphous members is low. For example, in the case of the material described in an embodiment of the related art reference, the specific resistance thereof is around 130 $\mu\Omega$ cm. Thus, it is supposed that when the magnetic flux that penetrates the inside of the paramagnetic amorphous member varies, an eddy current is generated therein and thereby the loss of the electric power takes place.

In contrast, since the ferrite sheet 7 used in the embodiment of the present invention is made of a magnetic material and has a large specific resistance, the magnetic flux can penetrate in the surface portion thereof without an occurrence of the eddy current. Thus, the structure of the embodiment of the present invention causes the loss of less electric power than in the structure of the related art reference.

In the embodiment of the present invention, the ferrite sheet 7 is used as a high resistance magnetic material member. However, the ferrite may be used in other than the sheet shape. For example, ferrite may be mixed with a resin. The resultant mixture may be coated to the structural member with a brush or the like or by dipping. In this case, as with the structure using the ferrite sheet 7, the loss of electric power can be decreased. In the method in which ferrite is mixed with resin and then coated on the structural member by brushing, dipping etc. its machinability is high. In particular, when the structural member 1 (guide rail) is long, the fabrication process can be simplified in this method.

This effect is remarkable for the structure of the related art reference. In other words, it is difficult to fabricate and machine the paramagnetic amorphous member (amorphous tape as used in the related art reference). In particular, as in the field of the present invention, the process for adhering a paramagnetic amorphous tape of a predetermined width over a very large area causes costs to rise. On the other hand, in the structure of the embodiment of the present invention, the ferrite sheet or the mixture of ferrite and resin can be inexpensively provided. In addition, since the machinability is high, these materials are cost-effective.

As described above, to form a closed magnetic circuit, a high magnetic permeability is required. In addition, to prevent an eddy current from occurring in the closed magnetic circuit, a high specific resistance is required. Thus, as a high resistance magnetic material, it is preferred to use a material whose relative magnetic permeability is 50 or more to form a satisfactory closed magnetic circuit whose specific resistance is 300 $\mu\Omega$ cm or more, to prevent an eddy current from occurring. In other words, as long as such conditions are satisfied, a material other than ferrite can be used. As an example of such a material, permalloy can be used. In this case, a solution of this material can be sprayed onto the structural member.

Figure 6:
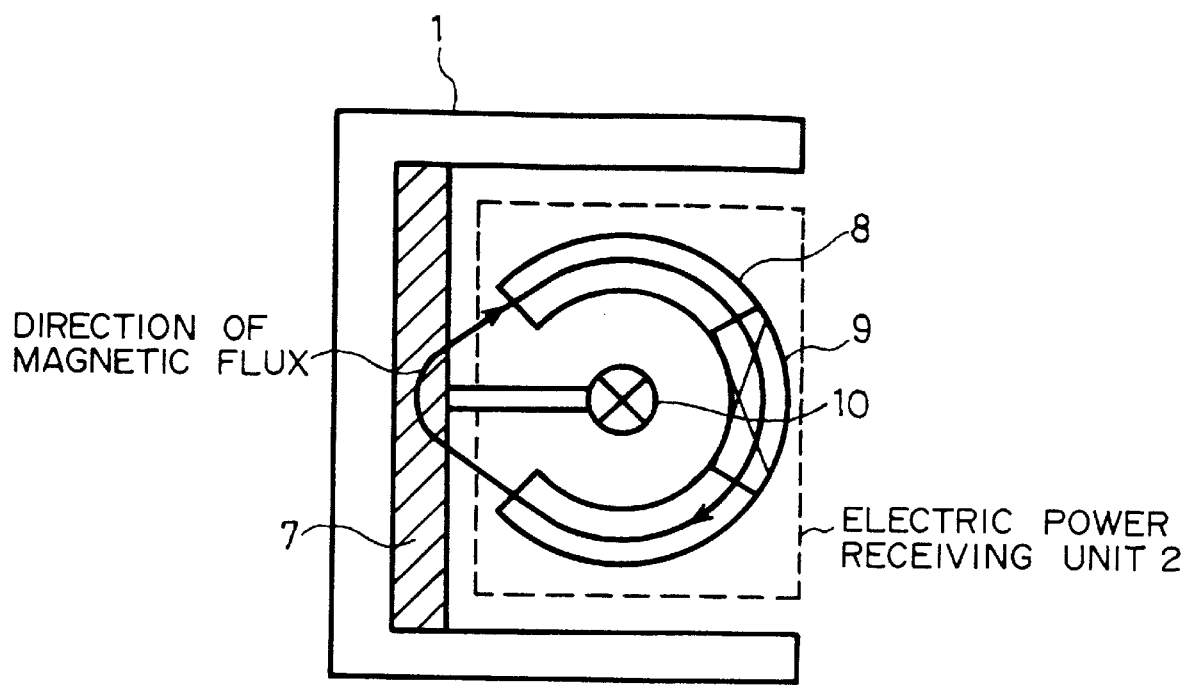
FIG. 6 is a schematic diagram showing principal portions in the case that a C-shaped magnetic material core is used as the core of the electric power receiving unit.

In the embodiment of the present invention, as the core of the electric power receiving unit 2, the E-shaped magnetic material core 3 is used. However, the present invention can also be applied to a core of another shape. FIG. 6 is a schematic diagram showing a sectional view of the principal portions of a C-shaped magnetic material core 8. In this case, as with the above-described embodiment of the present invention, the ferrite sheet 7 is disposed to the structural member 1. One of the outbound portion or inbound portion of a feeder 10 is placed in the C-shaped magnetic material core 8 that has a secondary coil 9. Electric power is obtained from the secondary coil 9 using the electromagnetic induction of an alternating magnetic field induced by an AC current that flows in the feeder 10.

In this case, the magnetic flux induced by the current that flows in the feeder 10 only penetrates the ferrite sheet 7 and the C-shaped magnetic material core 8. Thus, the magnetic flux does not reach the structural member 1, thus preventing an eddy current from occurring. Consequently, as with the structure shown in FIG. 4, the loss of electric power is decreased and thereby the output power of the secondary coil is increased.

Thus, according to the present invention, since the magnetic flux induced by the current that flows in the feeder only penetrates the core of the electric power receiving unit and the high resistance magnetic material member provided for the structural member, an eddy current can be sufficiently suppressed, thereby preventing loss of the electric power.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A non-contact electric power supplying system comprising a structural member for guiding an electrically powered vehicle, a feeder disposed along the structural member for supplying electric power from the feeder to an electric power receiving unit of the electrically powered vehicle; and a magnetic material for minimizing generation of eddy currents in the structural member, the magnetic material having high specific resistance for substantially preventing generation of eddy currents in the magnetic material, the magnetic material being disposed on a surface of the structural member in such a manner that the magnetic material is opposite to the electric power receiving unit.

2. The non-contact electric power supplying system as set forth in claim 1, wherein said magnetic material is made of ferrite and is disposed as a sheet.

3. The non-contact electric power supplying system as set forth in claim 1, wherein said magnetic material is made of a mixture of ferrite and resin.

4. The non-contact electric power supplying system as set forth in claim 1, wherein said magnetic material is made of permalloy.

5. A non-contact electric power supplying system comprising:

a structural member for guiding an electrically powered vehicle;

a feeder disposed along the structural member for supplying electric power from the feeder to an electric power receiving unit of the electrically powered vehicle; and a magnetic material disposed on a surface of the structural member in such a manner that the magnetic material is opposite to the electric power receiving unit, wherein the specific resistance of the magnetic material is greater than about 300 $\mu\Omega$ cm.

6. The system of claim 5, wherein the relative magnetic permeability of the magnetic material is greater than about 50.

7. A non-contact electric power supplying system comprising:

a structural member for guiding an electrically powered vehicle;

a feeder disposed along the structural member for supplying electric power from the feeder to an electric power receiving unit of the electrically powered vehicle; and a sheet comprising ferrite disposed on a surface of the structural member in such a manner that the sheet is opposite to the electric power receiving unit.

8. A non-contact electric power supplying system comprising:

a structural member for guiding an electrically powered vehicle;

a feeder disposed along the structural member for supplying electric power from the feeder to an electric power receiving unit of the electrically powered vehicle; and a magnetic material comprising a mixture of ferrite and resin disposed on a surface of the structural member in such a manner that the magnetic material is opposite to the electric power receiving unit.

9. A non-contact electric power supplying system comprising:

a structural member for guiding an electrically powered vehicle;

a feeder disposed along the structural member for supplying electric power from the feeder to an electric power receiving unit of the electrically powered vehicle; and a magnetic material of permalloy disposed on a surface of the structural member in such a manner that the magnetic material is opposite to the electric power receiving unit.

* * * * *